United States Patent [19]

Schramek

[11] Patent Number: 5,423,257
[45] Date of Patent: Jun. 13, 1995

[54] DEVICE FOR DETECTING THE POSITION OF AN ACTUATOR ON A PRINTING PRESS

[75] Inventor: Edmund Schramek, Sinsheim, Germany

[73] Assignee: Heidelberger Druckmaschinen AG, Heidelberg, Germany

[21] Appl. No.: 113,406

[22] Filed: Aug. 27, 1993

[30] Foreign Application Priority Data

Aug. 27, 1992 [DE] Germany .................. 42 28 494.5

[51] Int. Cl.$^6$ .............................................. B41F 31/02
[52] U.S. Cl. ................................... 101/365; 324/714
[58] Field of Search ................. 101/365; 324/704, 714; 340/870.38

[56] References Cited

U.S. PATENT DOCUMENTS 5,146,173  9/1992  Jurkewitz ........................... 101/365

FOREIGN PATENT DOCUMENTS 1280218  2/1991  Canada .
243661  11/1987  European Pat. Off. .
3900270  7/1990  Germany .

*Primary Examiner*—David A. Wiecking
*Assistant Examiner*—Steven S. Kelley
*Attorney, Agent, or Firm*—Herbert L. Lerner; Laurence A. Greenberg

[57] ABSTRACT

Device for detecting a position of an actuator on a printing press includes two potentiometers having respective wipers connected to the actuator and driven with mutually different transmission ratios, the two potentiometers being serially connected in a measuring circuit, and an evaluation device connected to the measuring circuit for receiving signals therefrom corresponding to measuring-circuit voltages of the potentiometers and for determining therefrom the position of the actuator.

5 Claims, 3 Drawing Sheets

DEVICE FOR DETECTING THE POSITION OF AN ACTUATOR ON A PRINTING PRESS

SPECIFICATION

The invention relates to a device for detecting the position of an actuator on a printing press, and more particularly to an actuator connected to wipers of two potentiometers driven with mutually different transmission ratios.

Heretofore known from published German Patent Document 39 00 70 A1 is a device for detecting the position of an actuator, particularly on a printing press. The actuator is connected to the wipers of two endless potentiometers and drives them with transmission ratios differing from one another. An evaluation device determines the position of the actuator from a voltage difference of the two endless potentiometers. With the device according to the invention, positioning accuracy is considerably improved, because a relatively large voltage excursion causes only a slight adjustment of the actuator.

A printing press has a multiplicity of actuators, the positions of which are determined and controlled, respectively, from a central control device by means of potentiometers and via potentiometer feedback or answer-back signals. Such a control device is described in published European Patent Document 02 43 661 A1. Analog signals from the potentiometers are fed via analog inputs to the central control device. If the difference of the voltages of the two potentiometers, as described in the published German Patent Document 39 00 270 A1, is evaluated, it is clearly evident that two analog inputs must be available on the control device for each actuator.

It is accordingly an object of the invention to provide a device for detecting the position of an actuator on a printing press which makes optimal use of analog inputs on a control device thereof.

With the foregoing and other objects in view, there is provided, in accordance with the invention, a device for detecting a position of an actuator on a printing press, comprising two potentiometers having respective wipers connected to the actuator and driven with mutually different transmission ratios, the two potentiometers being serially connected in a measuring circuit, and an evaluation device connected to the measuring circuit for receiving signals therefrom corresponding to measuring-circuit voltages of the potentiometers and for determining therefrom the position of the actuator.

In accordance with another feature of the invention the one potentiometer of the two potentiometers driven with a transmission ratio faster than that of the other of the two potentiometers is formed as a ganged potentiometer with an end stop and a slipping clutch.

In accordance with an alternative feature of the invention, the one potentiometer of the two potentiometers driven with a transmission ratio faster than that of the other of the two potentiometers is formed as an endless or infinite potentiometer.

In accordance with a further feature of the invention, the actuator is operatively connected to a side lay in a feeder region of a printing press.

In accordance with a concomitant alternative feature of the invention, the actuator is operatively connected to an ink key for positioning the ink key in a printing unit of a printing press.

Other features which are considered as characteristic for the invention are set forth in the appended claims.

Although the invention is illustrated and described herein as embodied in a device for detecting the position of an actuator on a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
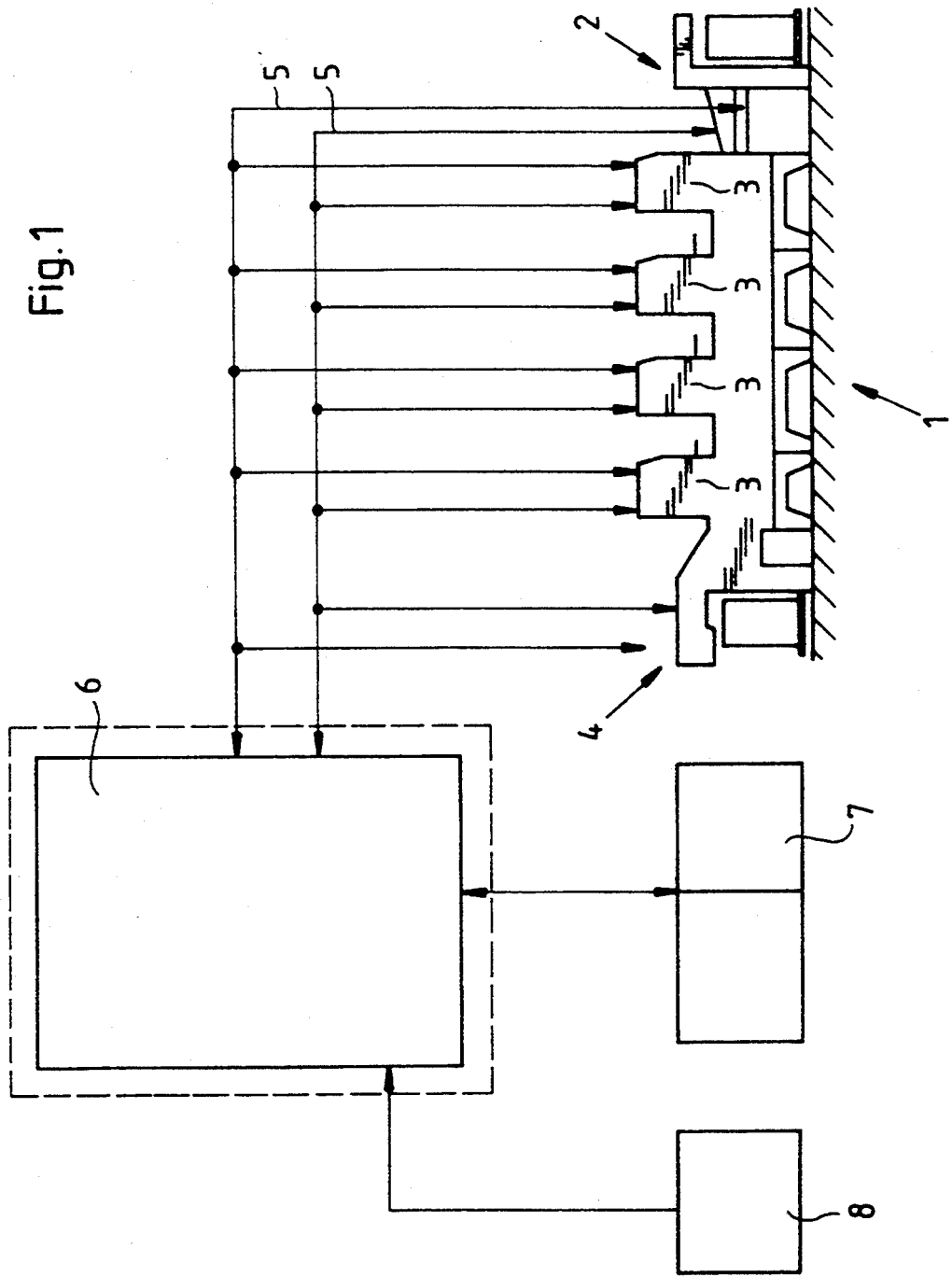
FIG. 1 is a diagrammatic side elevational view of a printing press together with a schematic view of a device according to the invention for detecting the position of an actuator.

Referring now to the drawing and, first, particularly to FIG. 1 thereof, there is shown diagrammatically therein a side elevational view of a printing press 1. The printing press 1 is formed of a feeder 2, printing units 3 and a delivery 4.

Individual actuators on the printing press 1 in the vicinity of the feeder 2, the printing units 3 and the delivery 4 are connected via signal lines 5 to a general or central electronics system 6, such as is described in U.S. Pat. No. 4,998,472 and known in the art under the trade name CP-Tronic of the Heidelberger Druckmaschinen AG. The general electronics system 6 receives actuating signals from a central control desk 7 and from an ink control system 8. The actuating signals are forwarded via the general electronics system 6 to the corresponding actuators, for example, to ink keys or screws in the inking unit or side lays in the the feeder region of the printing press 1. In order to verify or check the correct positions of the actuators, the analog measured values of the potentiometers are fed back to the general electronics system 6 via the respective signal lines 5.

Figure 2:
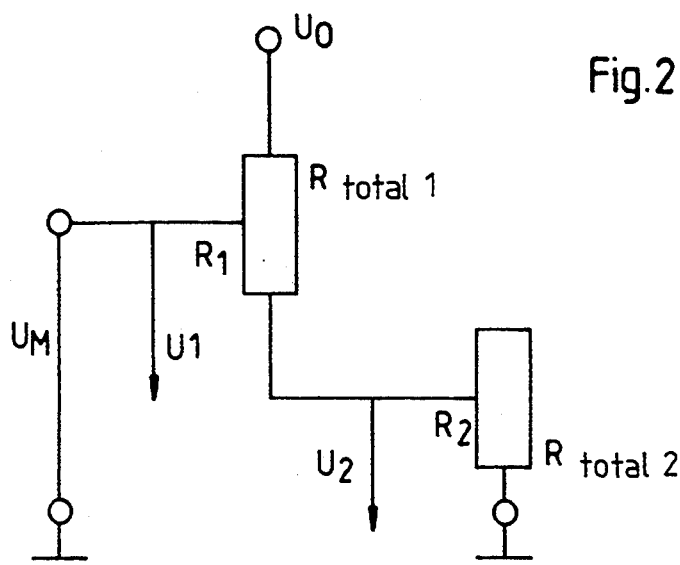
FIG. 2 is a schematic view of an electric circuit forming part of the device according to the invention.

FIG. 2 is a diagram of an electric circuit for the device according to the invention. Two potentiometers 9 and 10 have respective total resistances $R_{tot1}$ and $R_{tot2}$. For a given position of a respective actuator, a measuring-circuit voltage $U_M$ exists which is composed of the sum of partial voltages $U_1$ and $U_2$, which are picked off from the potentiometers 9 and 10, respectively. The measuring-circuit voltage $U_M$ is thus proportional to the sum of the instantaneous resistance values $R_1$ and $R_2$ of the respective potentiometers 9 and 10. The instantaneous resistance values $R_1$ and $R_2$ correspond to fractions of the total resistances $R_{tot1}$ and $R_{tot2}$ of the respective potentiometers 9 and 10 and can be expressed by the following equations:

$R_1 = k \cdot R_{tot1}$ wherein $0 \leq k \leq 1$ and $R_2 = c \cdot R_{tot2}$ wherein $0 \leq c \leq 1$.

Using this definition, the ratio of the measuring circuit voltage $U_M$ to the operating voltage $U_O$ is as follows:

$$\frac{U_M}{U_O} = \frac{R_1 + R_2}{R_{tot1} + R_2} = \frac{k \cdot R_{tot1} + c \cdot R_{tot2}}{R_{tot1} + c \cdot R_{tot2}} \quad (1)$$

Because n equals a given or specified ratio of the total resistance $R_{tot1}$ of the potentiometer 9 to the total resistance $R_{tot2}$ of the potentiometer 10, the foregoing equation (1) can be simplified as follows:

$$\frac{U_M}{U_O} = \frac{k \cdot n \cdot R_{tot2} + c \cdot R_{tot2}}{n \cdot R_{tot2} + c \cdot R_{tot2}} = \frac{k \cdot n + c}{n + c} \quad (2)$$

As described hereinbefore, c denotes the ratio of the instantaneous resistance value $R_2$ to the total resistance $R_{tot2}$ of the potentiometer 10; c may therefore assume any value between 0 and 1. If one considers the ratio of the measuring-circuit voltage $U_M$ to the operating voltage $U_O$ at the two extreme points c=0 and c=1, then, for c=0, the ratio of the measuring circuit voltage $U_M$ to the operating voltage $U_O$ is:

$$\frac{U_M}{U_O} = \frac{k \cdot n}{n} = k$$

For c=1, the ratio of the measuring-circuit voltage $U_M$ to the operating voltage $U_O$ is:

$$\frac{U_M}{U_O} = \frac{k \cdot n + 1}{n + 1}$$

Figure 4:
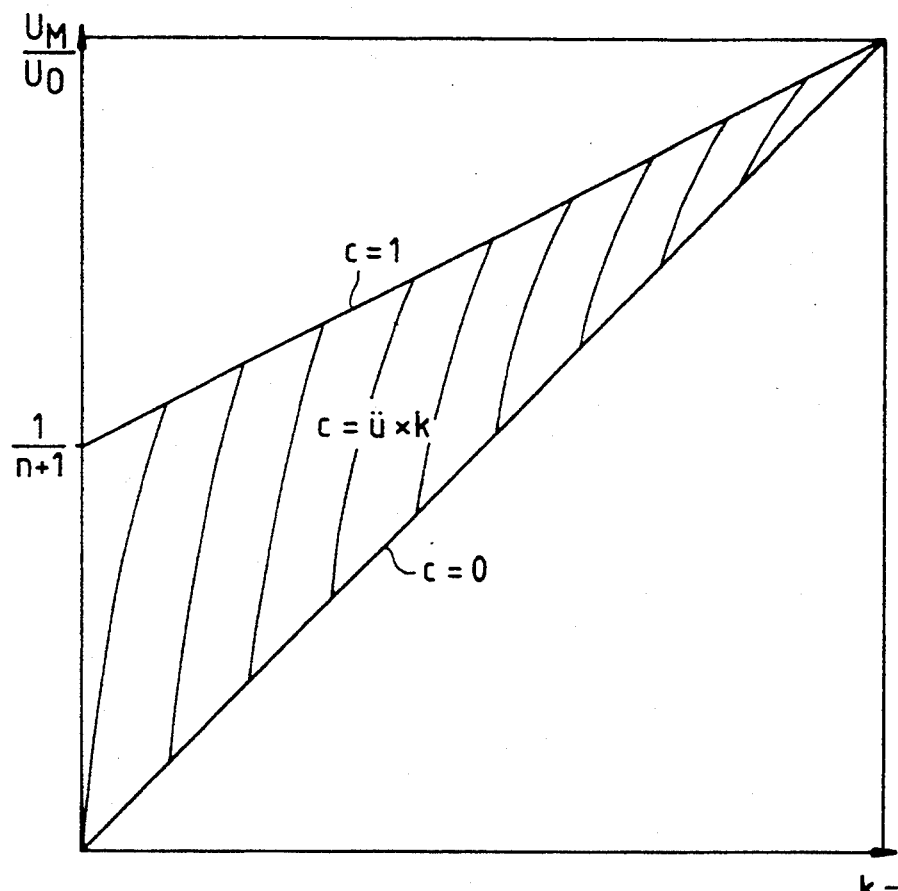
FIGS. 4 and 5 are plot diagrams for evaluating the respective measuring-circuit voltage $U_M$ according to each of two different embodiments of the device according to the invention.
Figure 5:
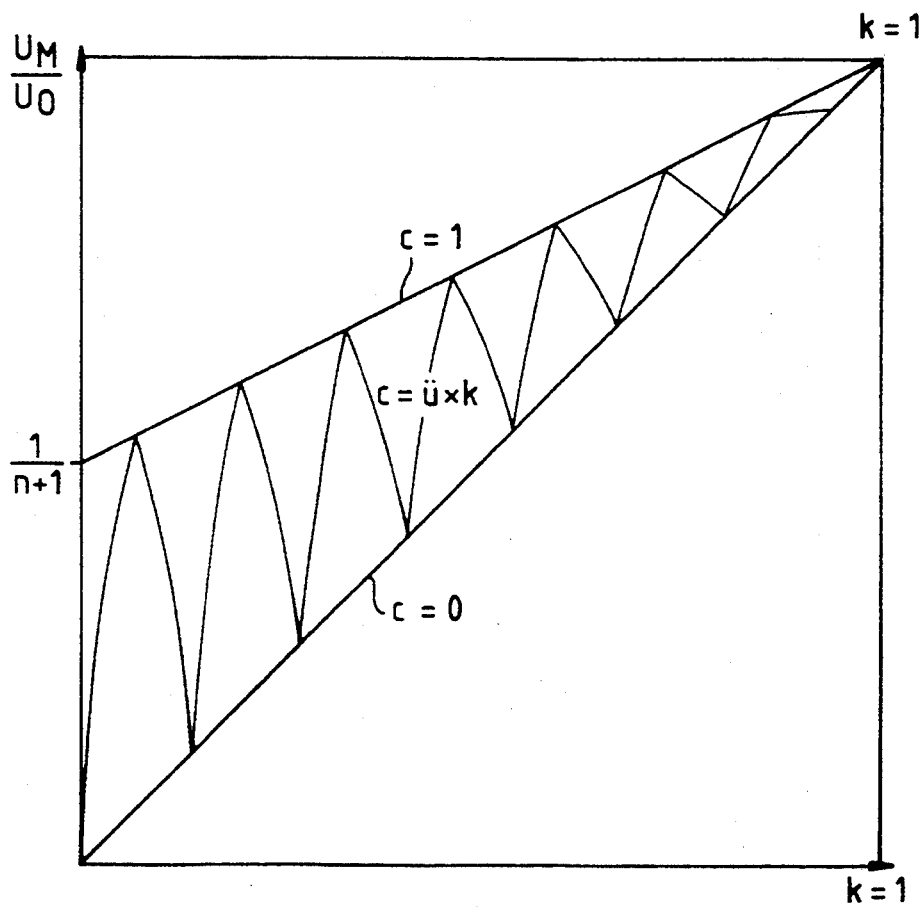

If the ratio of the measuring-circuit voltage $U_M$ to the operating voltage $U_O$ is plotted in a graph with respect to a factor k, which describes the instantaneous resistance value $R_1$ relative to the total resistance $R_{tot1}$ of the potentiometer 9, then, as represented in the plot diagrams of FIGS. 4 and 5, for c=0, an original straight line is formed having a slope of 1 and, for c=1, a straight line having an intersection point 1/(n+1) with the $U_M/U_O$ axis and intersecting the original straight line for c=0 at k=1.

Figure 3:
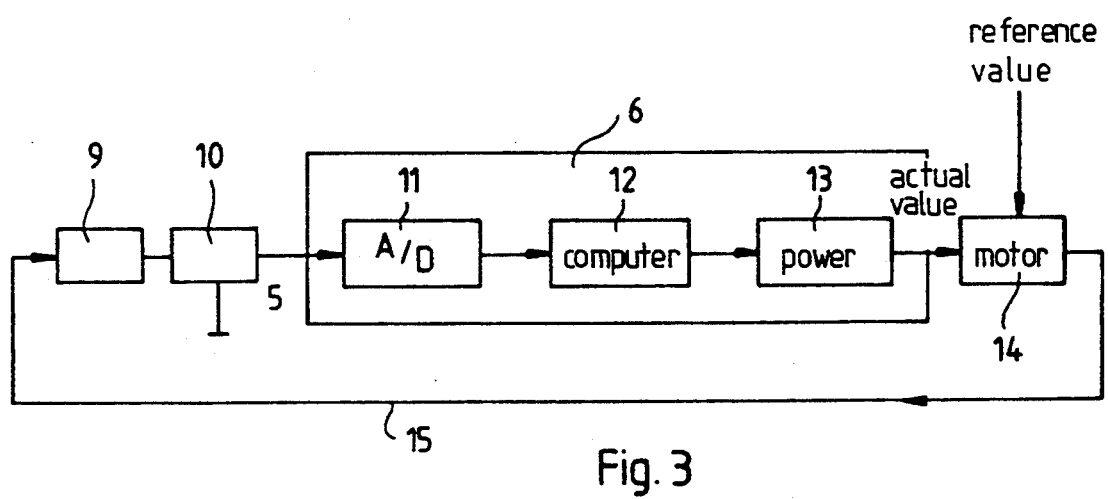
FIG. 3 is a block diagram showing the construction of the device according to the invention.

FIG. 3 is a block diagram of the construction of the device according to the invention. The sum of the output voltages $U_2$ of the two potentiometers 9 and 10 is sent via a signal line to an analog input of the general or central electronics system 6. In the electronics system 6, the measuring-circuit voltage $U_M$ is converted, through the intermediary of an analog/digital converter 11, a computer 12 and a power section 13, into actuating data for a respective motor 14 which is mechanically connected to the potentiometers 9 and 10 and drives the two potentiometers 9 and 10 with respective transmission ratios which differ from one another. The connection of the motor 14 to the potentiometers 9 and 10 is indicated schematically in FIG. 3 by an operative connection line 15.

FIG. 4 illustrates a family of characteristic curves when the potentiometer 10 is in the form of a ganged potentiometer with a slipping clutch.

Starting with the zero positions of the two potentiometers 9 and 10, the measuring-circuit voltage $U_M$ does not follow the straight line with c=0. If ü denotes the transmission ratio of c to k, then c is calculated between the values 0 and 1 as c=ü·k. If this product is substituted for c into the equation (2), a curve having a slope greater than 1 is formed for the ratio of the measuring-circuit voltage $U_M$ to the operating voltage $U_O$.

Because of the steeper rise of the measuring-circuit voltage $U_M$, the positioning accuracy of the drive can be considerably improved; relatively large changes in the measuring-circuit voltage $U_M$ correspond to relatively small changes in the actuator travel.

For example, if a side lay is to be positioned in the feeder region of the printing press 1, it is advisable to adopt the following procedure:

A position is coarsely preset, with the ratio of the measuring-circuit voltage $U_M$ to the operating voltage $U_O$ lying on the straight line with c=0. From this position, it is then possible to make a fine adjustment, with the ratio of the measuring-circuit voltage $U_M$ to the operating voltage $U_O$ then following a considerably steeper straight line c=ü·k.

FIG. 5 illustrates a family of characteristic curves which results when the potentiometer 10, which is driven with the faster transmission ratio, is formed as an endless or infinite potentiometer. The transitional straight lines with c=ü·k exhibit a saw-tooth characteristic between the two straight lines c=0 and c=1, i.e., the voltage change $\Delta U_M$ is positive or negative depending upon the position and direction of rotation of the potentiometer. This embodiment permits the actuator to be positioned with absolutely precise accuracy throughout the entire actuating or adjustment range. The procedure, in this regard, is as follows:

After being switched on, the potentiometer 10 is moved until an extreme measurement signal is obtained. As soon as a point is reached on the straight line c=0 and c=1, respectively, the instantaneous position of the actuator is known absolutely. From this point, it is possible once again to adjust the drive with increased resolution, due to the increased positioning accuracy determined by the rise of the saw-tooth voltage.

I claim:

1. Device for detecting a position of an actuator on a printing press, comprising two potentiometers having respective wipers connected to the actuator and driven with mutually different transmission ratios, said two potentiometers being serially connected in a measuring circuit, and an evaluation device connected to said measuring circuit for receiving signals therefrom corresponding to measuring-circuit voltages of the potentiometers and for determining therefrom the position of the actuator.

2. Device according to claim 1, wherein the one potentiometer of said two potentiometers driven with a transmission ratio faster than that of the other of said two potentiometers is formed as a ganged potentiometer with an end stop and a slipping clutch.

3. Device according to claim 1, wherein the one potentiometer of said two potentiometers driven with a transmission ratio faster than that of the other of said two potentiometers is formed as an endless or infinite potentiometer.

4. Device according to claim 1, wherein the actuator is operatively connected to a side lay in a feeder region of a printing press.

5. Device according to claim 1, wherein the actuator is operatively connected to an ink key for positioning said ink key in a printing unit of a printing press.

* * * * *